United States Patent [19]

Chu

[11] Patent Number: 4,912,073

[45] Date of Patent: Mar. 27, 1990

[54] LARGER PORE MOLECULAR SIEVES OF CONTROLLED ACTIVITY

[75] Inventor: Pochen Chu, W. Deptford, N.J.

[73] Assignee: Mobil Oil Corp., New York, N.Y.

[21] Appl. No.: 257,607

[22] Filed: Oct. 14, 1988

Related U.S. Application Data

[63] Continuation-in-part of Ser. No. 179,592, Oct. 7, 1987, abandoned, which is a continuation-in-part of Ser. No. 829,677, Feb. 14, 1986, abandoned, which is a continuation-in-part of Ser. No. 631,430, Jul. 16, 1984, abandoned.

[51] Int. Cl.$^4$ .......................... B01J 21/16; B01J 29/06
[52] U.S. Cl. ...................................... 502/85; 502/214
[58] Field of Search ...................... 502/61, 71, 77, 85, 502/86, 214; 423/328

[56] References Cited

U.S. PATENT DOCUMENTS

| | | |
|---|---|---|
| 4,524,140 | 6/1985 | Chang et al. ........................ 502/61 |
| 4,701,313 | 10/1987 | Chang et al. ........................ 502/85 |
| 4,753,910 | 6/1988 | Han et al. ............................ 502/85 |

*Primary Examiner*—Carl F. Dees
*Attorney, Agent, or Firm*—Alexander J. McKillop; Charles J. Speciale; Dennis P. Santini

[57] ABSTRACT

A method is provided for controlling the catalytic activity of a large pore molecular sieve which contains framework boron. Control is effected by treatment with a solution of a metal salt under conditions such that metal is incorporated into the molecular sieve framework.

31 Claims, No Drawings

LARGER PORE MOLECULAR SIEVES OF CONTROLLED ACTIVITY

CROSS-REFERENCE TO RELATED APPLICATIONS

This is a continuation-in-part of application Ser. No. 179,592, filed Oct. 7, 1987 now abandoned, which is a continuation of application Ser. No. 829,677, filed Feb. 14, 1986, now abandoned which is a continuation-in-part of application Ser. No. 631,430, filed July 16, 1984, now abandoned.

FIELD OF THE INVENTION

This invention relates to a method for controlling the catalytic activity of crystalline molecular sieves, e.g. silicates, and to the compositions produced by this method. In particular, a novel process is provided to incorporate divalent, trivalent, and/or tetravalent metals into the structure of larger pore crystalline molecular sieves containing initially from about 0.1 wt. % to about 2.5 wt. % framework boron, and thereby to control the acid activity of such crystalline silicates.

BACKGROUND OF THE INVENTION

Zeolite catalysts have become widely used in the processing of petroleum and in the production of various petrochemicals. Reactions such as cracking, hydrocracking, catalytic dewaxing, alkylation, dealkylation, transalkylation, isomerization, polymerization, addition, disproportionation and other acid catalyzed reactions may be performed with the aid of these catalysts. Both natural and synthetic zeolites are known to be active for these reactions.

The common crystalline zeolite catalysts are the aluminosilicates such as zeolites A, X, Y and mordenite. Structurally, each such material can be described as a robust three dimensional framework of $SiO_4$ and $AlO_4$ tetrahedra that are crosslinked by the sharing of oxygen atoms whereby the ratio of total aluminum and silicon atoms to oxygen is 1:2. These structures (as well as other crystalline zeolites of catalytic usefulness) are porous, and permit access of reactant molecules to the interior of the crystal through windows formed of eight-membered rings (small pore) or of twelve-membered rings (large pore). The electrovalence of the aluminum that is tetrahedrally contained in the robust framework is balanced by the inclusion of cations in the channels (pores) of the crystal.

An "oxide" empirical formula that has been used to describe the above class of crystalline zeolites is

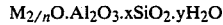

$M_{2/n}O.Al_2O_3.xSiO_2.yH_2O$ wherein M is a cation with valence n, x has a value of from 2 to 10, and y has a value which depends on the pore volume of the particular crystal structure under discussion. The empirical oxide formula may be rewritten as a general "structural" formula

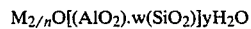

$M_{2/n}O[(AlO_2).w(SiO_2)]yH_2O$ wherein M and y are defined as above, and wherein w has a value from 1 to 5. In this representation, the composition of the robust framework is contained within the square brackets, and the material (cations and water) contained in the channels is shown outside the square brackets. One skilled in the art will recognize that x in the empirical oxide formula represents the mole ratio of silica to alumina in the robust framework of a crystalline zeolite, and shall be referred to herein simply by the expression in common usage, i.e. "the silica to alumina ratio". (See *Zeolite Molecular Sieves*, Donald W. Breck, chapter one, John Wiley and Sons, New York, N.Y., 1974, which is incorporated herein by reference as background material).

With few exceptions (such as with Zeolite A wherein x=2), there are fewer alumina tetrahedra than silica tetrahedra in the robust frameworks of the crystalline zeolites. Thus, in general, aluminum represents the minor tetrahedrally coordinated constituent of the robust frameworks of the common zeolites found in nature or prepared by the usual synthetic methods that employ only inorganic reagents.

For the above common zeolite compositions, wherein x has a value of 2 to 10, it is known that the ion exchange capacity measured in conventional fashion is directly proportional to the amount of the minor constituent in the robust framework, provided that the exchanging cations are not so large as to be excluded by the pores. If the zeolite is exchanged with ammonium ions and calcined to convert it to the hydrogen form, it acquires a large catalytic activity measured by the alpha activity test for cracking n-hexane, which test is more fully described below; and the ammonium form itself desorbs ammonia at high temperature in a characteristic fashion.

It is generally recognized that the composition of the robust framework of the synthetic common zeolites, wherein x=2 to 10, may be varied within relatively narrow limits by changing the proportion of reactants, e.g. by increasing the concentration of the silica relative to the alumina in the zeolite forming mixture. However, definite limits in the maximum obtainable silica to alumina ratio are observed. For example, synthetic faujasites having a silica to alumina ratio of about 2.5 to 5.6 can be obtained by changing said relative proportions. However, if the silica proportion is increased above the level which produces the 5.6 ratio, no commensurate increase in the silica to alumina ratio of the crystallized synthetic faujasite is observed. Thus, the silica to alumina ratio of about 5.6 must be considered an upper limit for synthetic faujasite in a preparative process using conventional reagents. Corresponding upper limits in the silica to alumina ratio of mordenite and erionite via the synthetic pathway are also observed.

It is sometimes desirable to obtain a particular zeolite, for any of several reasons, with a higher or a lower silica to alumina ratio than is available by direct synthesis. With ion-exchange applications, for example and for catalytic reactions such as hydrocracking which require high acidity catalysts, low silica to alumina rations are favorable. For structural stability to heat and steam, or high-temperature xylene isomerization, high silica to alumina ratios are required. U.S. Pat. No. 4,273,753 to Chang and the references contained therein describe several methods for removing some of the aluminum from the framework by the use of aggressive treatments such as steaming, contact with chelating agents, etc., thereby increasing the silica to alumina ratio of a crystal. However, no generally useful method appears to have been described for increasing the alumina content (decreasing the silica to alumina ratio) of a zeolite crystal. Thus, although it is relatively easy to reversibly alter the composition of the materials (cations and water) contained within the channels of the crystalline zeolites, no generally useful method is known for reversibly altering the content of the minor tetrahedrally coordinated constituent in the robust framework.

A class of synthetic high silica content crystalline zeolites wherein x is at least 12, has recently been discovered. In general, such zeolites are made from a forming solution which contains an organic template. Unlike the common synthetic zeolites, these high-silica content zeolites appear to have no natural counterpart. Members of this new class of zeolites have many advantageous properties, which properties generally include a high degree of structural stability. They are used or have been proposed for use in various processes, especially catalytic processes. Known materials of this type include, for example, zeolite Beta (U.S. Pat. No. 3,308,069); ZSM-5 (U.S. Pat. No. 3,702,886); ZSM-11 (U.S. Pat. No. 3,709,979); and ZSM-12 (U.S. Pat. No. 3,832,449).

The $SiO_2/Al_2O_3$ ratio of a given molecular sieve is often variable. For example, zeolite X can be synthesized with $SiO_2/Al_2O_3$ ratios of from 2 to 3; zeolite Y, from 3 to about 6. In some zeolites, the upper limit of the $SiO_2/Al_2O_3$ ratio is unbounded. ZSM-5 is one such example wherein the $SiO_2/Al_2O_3$ ratio is at least 5 and up to the limits of present analytical measurement techniques. U.S. Pat. No. 3,941,871 (RE. 29,948) discloses a porous crystalline silicate made from a reaction mixture containing no deliberately added alumina in the recipe and exhibiting the X-ray diffraction pattern characteristic of ZSM-5. U.S. Pat. Nos. 4,061,724; 4,073,865; and 4,104,294 describe crystalline silicate of varying alumina and metal content.

In some instances, incorporating an oxide of boron in the forming solution of a high silica content zeolite results in a zeolite that contains framework boron.

SUMMARY OF THE INVENTION

I have now found that the acidic catalytic activity (alpha value) of a high silica content crystalline molecular sieve, e.g. zeolite, of larger pore size, provided it contains at least 0.1 wt% framework boron, is controlled, e.g. increased or decreased, if the molecular sieve is treated with an aqueous solution, preferably mildly acidic, of the salt of a divalent, trivalent and/or tetravalent metal, as more fully described hereinbelow. The process of this invention proceeds under unusually mild conditions, such as, for example, by contacting the molecular sieve with the salt solution for 2 hours at 100° C.

The novel compositions produced by the method of this invention are useful as catalysts for hydrocarbon conversion reactions, as sorbents and for ion exchange applications.

While I do not know why the results are achieved so easily, the data in the examples given below show that the framework boron content of the crystals is reduced by the contacting procedure while the divalent, trivalent and/or tetravalent metal content of the crystals is increased, resulting effectively in an exchange of metal for at least a portion of the boron originally present in the robust framework. The added metal contributes change in acid activity of the treated crystals, while little or no diminution of acid activity results from loss of boron.

DETAILED DESCRIPTION AND PREFERRED EMBODIMENTS

The entire contents of applications Ser. No. 179,592, filed Oct. 7, 1987; Ser. No. 829,677, filed Feb. 14, 1986; and Ser. No. 631,430, filed July 16, 1984, are incorporated herein by reference.

As has heretofore been stated, the novel process of this invention is concerned with the treatment of high silica content crystalline molecular sieves, e.g. silicates such as aluminosilicates, silicoaluminophosphates, layered materials and the like, of larger pore size that contain at least 0.1 wt% of framework boron. The molecular sieve may contain as much as about 2.5 wt. % or more framework boron.

The expression "high silica content" as used herein means a crystalline molecular sieve structure that has a silica to alumina ratio greater than about 30 to 1 and preferably greater than about 100 to 1 up to and including those crystalline zeolites for which the silica to alumina ratio approaches the limits of present analytical measurement techniques. Such high silica materials may sometimes be prepared from reaction solutions which contain no deliberate addition of aluminum. However, trace quantities of aluminum are usually present due to the impurity of the reaction solutions. The silica to alumina ratio may be determined by conventional analysis. The ratio represents, as closely as possible, the ratio in the robust framework of the crystal, and is intended to exclude materials such as aluminum in the binder or in another form within the channels of the crystal. The ratio also may be determined by the thermogravimetric analysis (TGA) of desorption of ammonia from the ammonium form of the molecular sieve. This method is described in *Thermochimica Acta*, 3, pages 113-124, 1971, which is incorporated herein by reference.

The term "larger pore size" as used herein means a pore size defined by apertures or "windows" of at least 12-membered rings of oxygen atoms, such as are found in zeolite X, or pores which behave in the fashion of those defined in that manner.

The preferred silicates for treatment by the method of this invention, in addition to the requisite boron content and the requisite silica to alumina ratio, have crystal structures exhibiting Constraint Indices of less than about 2.5, such as, for example, zeolite Beta, ZSM-12, and mordenite. The Constraint Index for these silicates will usually be within the range of from about 0.4 to about 2.5. For purpose of the present invention, zeolite Beta, with a Constraint Index varying, depending upon test temperature, from about 0.6 to about 2.0, is particularly preferred.

Constraint Index is a convenient measure of the extent to which a molecular sieve crystal provides control to molecules of varying sizes to its internal structure. Molecular sieves which provide a highly restricted access to and egress from its internal structure have a high value for the Constraint Index, and molecular sieves of this kind usually have pores of small size, e.g. less than 5 Angstroms. On the other hand, molecular sieves which provide relatively free access to the internal crystal structure have a low value for the Constraint Index, and usually pores of large size, e.g. greater than 8 Angstroms. The method by which Constraint Index is determined is described fully in U.S. Pat. No. 4,016,218, incorporated herein by reference for details of the method.

Constraint Index (CI) values for some typical materials are:

|  | CI (at test temperature) |
| --- | --- |
| ZSM-4 | 0.5 (316° C.) |
| ZSM-5 | 6-8.3 (371° C.-316° C.) |
| ZSM-11 | 5-8.7 (371° C.-316° C.) |
| ZSM-12 | 2.3 (316° C.) |
| ZSM-20 | 0.5 (371° C.) |
| ZSM-22 | 7.3 (427° C.) |
| ZSM-23 | 9.1 (427° C.) |
| ZSM-34 | 50 (371° C.) |
| ZSM-35 | 4.5 (454° C.) |
| ZSM-48 | 3.5 (538° C.) |
| ZSM-50 | 2.1 (427° C.) |
| TMA Offretite | 3.7 (316° C.) |
| TEA Mordenite | 0.4 (316° C.) |
| Clinoptilolite | 3.4 (510° C.) |
| Mordenite | 0.5 (316° C.) |
| REY | 0.4 (316° C.) |
| Amorphous Silica-alumina | 0.6 (538° C.) |
| Dealuminized Y | 0.5 (510° C.) |
| Erionite | 38 (316° C.) |
| Zeolite Beta | 0.6-2.0 (316° C.-399° C.) |

The above-described Constraint Index is an important and even critical definition of those molecular sieves which are useful in the instant invention. The very nature of this parameter and the recited technique by which it is determined, however, admit of the possibility that a given molecular sieve can be tested under somewhat different conditions and thereby exhibit different Constraint Indices. Constraint Index seems to vary somewhat with severity of operations (conversion) and the presence or absence of binders. Likewise, other variables, such as crystal size of the molecular sieve, the presence of occluded contaminants, etc., may affect the Constraint Index. Therefore, it will be appreciated that it may be possible to so select test conditions, e.g. temperature, as to establish more than one value for the Constraint Index of a particular molecular sieve. This explains the range of Constraint Indices for some molecular sieves, such as ZSM-5, ZSM-11 and Beta.

It is to be realized that the above CI values typically characterize the specified molecular sieves, but that such are the cumulative result of several variables useful in the determination and calculation thereof. Thus, for a given molecular sieve exhibiting a CI value within a particular range, depending on the temperature employed during the the test method within the range of 290° C. to about 538° C., with accompanying conversion between 10% and 60%, the CI may vary within the indicated range. Likewise, other variables such as the crystal size of the molecular sieve, the presence of possibly occluded contaminants and binders intimately combined with the molecular sieve may affect the CI. It will accordingly be understood to those skilled in the art that the CI, as utilized herein, while affording a highly useful means for characterizing the molecular sieve of interest is approximate, taking into consideration the manner of its determination, with the possibility, in some instances, of compounding variable extremes. However, in all instances, at a temperature within the above-specified range of 290° C. to about 538° C., the CI will have a value for any given molecular sieve of interest herein within the approximate range of about 0.4 to about 2.5.

The principal lines and their relative intensities (R.I.) for Zeolite Beta, ZSM-12 are mordenite are given below in Tables I, II, and III, respectively.

TABLE I

| Zeolite Beta | |
| --- | --- |
| d-Spacing (A.U.) | R.I. |
| 11.5 + 0.3 | M-S |
| 7.4 + 0.2 | W |
| 6.6 + 0.15 | W |
| 4.15 + 0.10 | W |
| 3.97 + 0.10 | VS |
| 3.00 + 0.07 | W |
| 2.05 + 0.05 | W |

TABLE II

| ZSM-12 | |
| --- | --- |
| d-Spacing (A.U.) | R.I. |
| 11.9 + 0.2 | M |
| 10.1 + 0.2 | M |
| 4.76 + 0.10 | W |
| 4.29 + 0.08 | VS |
| 3.98 + 0.08 | M |
| 3.87 + 0.07 | VS |
| 3.49 + 0.07 | W |
| 3.38 + 0.07 | M |
| 3.20 + 0.06 | W |
| 3.05 + 0.05 | W |
| 2.54 + 0.03 | W |

TABLE III

| Mordenite |
| --- |
| d-Spacing (A.U.) |
| 13.70 + 0.3 |
| 9.10 + 0.2 |
| 6.61 + 0.15 |
| 5.79 + 0.10 |
| 4.53 + 0.10 |
| 4.00 + 0.10 |
| 3.84 + 0.08 |
| 3.48 + 0.08 |
| 3.39 + 0.07 |
| 3.22 + 0.07 |
| 2.90 + 0.05 |

Methods for preparing high silica content structures that contain framework boron are not considered part of the present invention. The amount of boron contained in the structure usually may be made to vary by incorporating different amounts of borate ion in the appropriate forming solution.

The divalent, trivalent and/or tetravalent metals to be inserted into the molecular sieve structure by the present method include individually or in combination those of Groups IIIA (e.g. $Al^{+3}$, $Ga^{+3}$ and $In^{+3}$); IVA (e.g. $Sn^{+4}$); IB (e.g. $Cu^{+2}$); IIB (e.g. $Zn^{+2}$); IIIB (e.g. $Sc^{+3}$ and $La^{+3}$); IVB (e.g. $Ti^{+3}$, $Ti^{+4}$ and $Zr^{+4}$); VIB (e.g. $Cr^{+3}$); and VIII (e.g. $Fe^{+3}$, $Co^{+2}$ and $Ni^{+2}$) of the Periodic Table of the Elements. The acid activity of the final crystalline product from the present method will have a tailored or controlled value depending upon the metal incorporated and the amount of that metal incorporated, as will be demonstrated hereinafter.

For the purpose of the present invention, the crystalline molecular sieve to be treated is calcined in air at elevated temperature to remove organic matter if such is present. It is then converted by ion exchange to the ammonium form, after which, if desired, it may be calcined to convert the ammonium form to the hydrogen form. Either the hydrogen or the ammonium form may be used, since the method of this invention appears to be highly effective with both.

The above-described composition, consisting essentially of a high silica content large pore molecular sieve that contains at least 0.1 wt% framework boron, is contacted with a solution of the salt of the appropriate metal selected from the group consisting of those of Groups IIIA, IVA, IB, IIB, IIIB, IVB, VIB and VIII of the Periodic Table of the Elements and mixtures thereof. Useful salts include those of common mineral acids such as nitrates, chlorides and sulfates, although it is contemplated that other soluble salts such as fluorides, acetates, etc., may be equally effective. The salt primarily functions as a source of metal cation, which is believed to be the species which is responsible for the resulting activity. The preferred salts are the trivalent metal salts of the mineral acids, since these hydrolyze in aqueous solution to provide a mildly acidic aqueous medium in which the salt is maintained in solution and in which the process proceeds very readily.

Although the described salts of the mineral acids are preferred because they permit the method of this invention to be practiced in one step, this invention also may be practiced with any soluble salt of the appropriate metal which in solution has a pH greater than about 6, provided that the zeolite is treated first with water or any aqueous solution of pH less than 6 under conditions effective to hydrolyze at least a portion of said framework boron, followed by contact with said salt solution. In this embodiment of the invention, the hydrogen form of the crystals are first treated with liquid water at a temperature of about 25° C. to 125° C. for about 0.1 hour to 80 hours to induce hydrolysis with simultaneous removal of boron from the crystals. The ammonium form also may be treated, and even the sodium form, to effect hydrolysis, keeping in mind that these will hydrolyze more slowly than the hydrogen form. However, the hydrolysis of these forms will benefit from use of water which is made mildly acidic, thereby converting in situ the ammonium or the sodium form to the hydrogen form. Saturated steam also may be used to induce or to speed hydrolysis, with or without subsequent washing to remove boron. In general, the contemplated conditions for the hydrolysis are:

|  | Temperature | Time |
| --- | --- | --- |
| broad | 15° C.–200° C. | 0.05–100 hrs. |
| preferred | 25° C.–125° C. | 0.1–80 hrs. |
| most preferred | 50° C.–100° C. | 0.2–20 hrs. |

The two-step technique described above is disclosed with reference to intermediate pore-size crystals in U.S. Pat. No. 4,526,880.

Contacting conditions are not believed to be critical. As will be seen from the examples which follow, metal incorporation takes place with activation when the crystals are treated for 2 hours, for example, with 0.1 Normal solutions of ferric or aluminum nitrate, or with 50% solution of $Al_2(OH)_5 Cl$ solution, all at 100° C. Broadly, it is contemplated to contact the crystals from about 0.05 hours to about 10 hours with an aqueous solution of the salt at a temperature of about 20° C. to about 150° C., under a combination of conditions effective to induce the desired metal incorporation and activity control.

In general, following the contacting step, the molecular sieve is separated from the solution, washed with water, and calcined, e.g. heated to a temperature of up to about 538° C. in air.

The term "acid catalytic activity" as used herein refers to the effectiveness of a molecular sieve, when in suitable form, for catalyzing reactions known to be promoted by so-called acid catalysts. Catalytic cracking, hydrocracking, skeletal isomerization, dewaxing, and various aromatic hydrocarbon reactions, such as alkylation, dealkylation, isomerization and disproportionation, are hydrocarbon conversion reactions which fall in the category of acid catalyzed reactions. Other reactions, such as alcohol dehydration, are also in this class.

As is known in the art, the acid catalytic acitivity of a molecular sieve may be measured by its "alpha value", which is the ratio of the rate constant of a test sample for cracking normal hexane to the rate constant of a standard reference catalyst. Thus, an alpha value = 1 means that the test sample and the reference standard have about the same activity. The alpha test is described in U.S. Pat. No. 3,354,078, the *Journal of Catalysis*, Vol. 4, p. 527 (1965); Vol. 6, p. (1966); and Vol. 61, p. 395 (1980), each of which is incorporated herein by reference. The experimental conditions of the test used herein include a constant temperature of 538° C. and variable flow rate as described in the *Journal of Catalysis*, Vol. 61, p. 395. Measurement of the "alpha value" is useful to assess the degree of activity control achieved with any sample treated by the method of this invention.

It is noted that the method of this invention is readily adapted to achieve a controlled activation, i.e. a predetermined activity. This may be done in one or more ways. By limiting the boron content of the material to be treated, the degree of activation is thereby limited. Or by limiting the amount of salt in contact with the molecular sieve, or the treating time, or by use of lower temperature, a predetermined activation can be achieved. Or the molecular sieve may be steamed at elevated temperature at any stage of its treatment to reduce its activity to a predetermined level. Since treatment with an iron salt does not increase activity as markedly as with an aluminum salt, this option, too, provides a means for controlling the ultimate activity of the molecular sieve by treating sequentially with iron and then with aluminum, or with a mixture of the two metal salts.

As is the case with many catalysts, it may be desired to incorporate the molecular sieve product of this invention with another material resistant to the temperatures and other conditions employed in organic conversion processes. Such materials include active and inactive materials as well as inorganic materials such as clays, silica and/or metal oxides.

As disclosed in U.S. Pat. No. 4,526,880, a boron containing crystalline silicate material is activated by compositing with a binder such as alumina. It is clear that such a type of "activating" binder must not present if one wishes to practice the present invention. Binders which are free of the activating metals of this invention may be present, however, and not interfere. The above stricture on activating binders of course does not apply after the silicate is treated by the method of this invention.

Binders useful for compositing with the molecular sieve product also include inorganic oxides, notably alumina, which is particularly preferred.

In addition to the foregoing materials, the molecular sieve catalyst can be composited with a porous matrix material such as silica-alumina, silica-magnesia, silicazirconia, silica-thoria, silica-beryllia, silica-titania as well as ternary compositions such as silica-alumina-thoria, silica-alumina-zirconia, silica-alumina-magnesia and silica-magnesia-zirconia. The relative proportions of finely divided crystalline molecular sieve and inorganic oxide matrix vary widely with the molecular sieve content ranging from about 1 to about 90 percent by weight and more usually in the range of about 20 to about 80 percent by weight of the composite.

In general, after completion of the compositing step, it is desirable to ion exchange the molecular sieve with an ammonium salt and to convert this to the hydrogen form by calcination prior to use of the product as catalyst.

The product of the present invention is useful as a catalyst component for a variety of organic, e.g. hydrocarbon, compound conversion processes. Such conversion processes include, as non-limiting examples, cracking hydrocarbons with reaction conditions including a temperature of from about 300° C. to about 700° C., a pressure of from about 0.1 atmosphere (bar) to about 30 atmospheres and a weight hourly space velocity of from about 0.1 $hr^{-1}$ to about 20 $hr^{-1}$; dehydrogenating hydrocarbon compounds with reaction conditions including a temperature of from about 300° C. to about 700° C., a pressure of from about 0.1 atmosphere to about 10 atmospheres and a weight hourly space velocity of from about 0.1 $hr^{-1}$ to about 20 $hr^{-1}$; converting paraffins to aromatics with reaction conditions including a temperature of from about 100° C. to about 700° C., a pressure of from about 0.1 atmosphere to about 60 atmospheres, a weight hourly space velocity of from about 0.5 $hr^{-1}$ to about 400 $hr^{-1}$ and a hydrogen/hydrocarbon mole ratio of from about 0 to about 20; converting olefins to aromatics, e.g. benzene, toluene and xylenes, with reaction conditions including a temperature of from about 100° C. to about 700° C., a pressure of from about 0.1 atmosphere to about 60 atmospheres, a weight hourly space velocity of from about 0.5 to about 400 and a hydrogen/hydrocarbon mole ratio of from about 0 to about 20; converting alcohols, e.g. methanol, or ethers, e.g. dimethylether, or mixtures thereof to hydrocarbons including aromatics with reaction conditions including a temperature of from about 300° C. to about 550° C., more preferably from about 370° C. to about 500° C., a pressure of from about 0.01 psi to about 2000 psi, more preferably from about 0.1 psi to about 500 psi, and a liquid hourly space velocity of from about 0.5 to about 100; isomerizing xylene feedstock components with reaction conditions including a temperature of from about 230° C. to about 510° C., a pressure of from about 3 atmospheres to about 35 atmospheres, a weight hourly space velocity of from about 0.1 to about 200 and a hydrogen/hydrocarbon mole ratio of from about 0 to about 100; disproportionating toluene with reaction conditions including a temperature of from about 200° C. to about 760° C., a pressure of from about atmospheric to about 60 atmospheres and a weight hourly space velocity of from about 0.08 to about 20; alkylating aromatic hydrocarbons, e.g. benzene and alkylbenzenes, in the presence of an alkylating agent, e.g. olefins, formaldehyde, alkyl halides and alcohols, with reaction conditions including a temperature of from about 340° C. to about 500° C., a pressure of from about atmospheric to about 200 atmospheres, a weight hourly space velocity of from about 2 to about 2000 and an aromatic hydrocarbon/alkylating agent mole ratio of from about 1/1 to about 20/1; and transalkylating aromatic hydrocarbons in the presence of polyalkylaromatic hydrocarbons with reaction conditions including a temperature of from about 340° C. to about 500° C., a pressure of from about atmospheric to about 200 atmospheres, a weight hourly space velocity of from about 10 to about 1000 and an aromatic hydrocarbon/polyalkylaromatic hydrocarbon mole ratio of from about 1/1 to about 16/1.

Particular catalytic conversions for which the product molecular sieve of the present invention can be used include (i) toluene disproportionation, (ii) toluene alkylation with methanol, (iii) propane (e.g. essentially pure propane) conversion to hydrocarbon mixtures enriched in BTX, (iv) upgrading refinery off-gas to liquid products enriched in BTX, and conversion of $C_1$–$C_4$ alcohols and/or $C_2$–$C_4$ ethers to hydrocarbons. It will be understood that BTX stands for aromatic hydrocarbon mixtures composed of two or more of benzene, toluene, xylene and ethylbenzene. The refinery off-gas is composed primarily of $C_1$–$C_3$ hydrocarbons and, optionally, hydrogen. This refinery off-gas will comprise at least 10% by weight of olefins (i.e. ethylene and/or propylene).

This invention will now be illustrated by examples which are not to be interpreted as limiting the scope of the invention, said scope being set forth by the entire specification including the appended claims. All parts and proportions are by weight unless explicitly stated to be otherwise.

EXAMPLE 1

A boron-containing molecular sieve zeolite Beta was prepared from a forming solution that included boric acid. This material was calcined in air and converted to the ammonium form by exchanging the calcined base with $NH_4NO_3$ solutions at an adjusted solution pH of 9 to 10 range. The water-washed and dried $NH_4$ form was found to have the X-ray diffraction pattern of zeolite Beta and the following elemental analysis:

$SiO_2$ 79.2% Weight
$Al_2O_3$ 0.72% Weight
$B_2O_3$ 3.28% Weight
Na 0.02% Weight
N 1.14% Weight
Ash 82.4% Weight

EXAMPLE 2

A portion of the ammonium form molecular sieve zeolite of Example 1 was treated with 50% weight $Al_2(OH)_5Cl$ solution (20 ml/g of zeolite) at 100° C. for 2 hours. The solid was filtered, water-washed and calcined at 1000° F. in air for 3 hours. The activity of the sample measured by alpha test was 462 compared to 28 of that of the untreated acid form.

EXAMPLE 3

Another portion of the ammonium product of Example 1 was treated as described in Example 2 except 0.1N $Al(NO_3)_3$ solution was used instead of $Al_2(OH)_5Cl$ solution. The alpha test result of the calcined product was 541.

EXAMPLE 4

Another preparation was made as described in Example 2 except that 0.1N $Fe(NO_3)_3$ solution was used instead of $Al_2(OH)_5Cl$ solution. The alpha test result was 53.

EXAMPLE 5

Another preparation was made as described in Example 2 except that the hydrogen form molecular sieve zeolite obtained by calcining a sample of the ammonium form molecular sieve zeolite of Example 1 was used instead of the $NH_4$ form. The alpha test result was 534.

EXAMPLE 6

Another preparation was made as described in Example 3 except acid form molecular sieve zeolite was used instead of $NH_4$ form. The alpha test result was 47.

EXAMPLE 7

Part of the preparations made in the above five examples, and a sample of the hydrogen form zeolite obtained by calcining the ammonium form zeolite of Example 1, were steamed at 1000° F. for 6 hours with 100% steam. The alpha test results of the steamed samples are 81, 62, 57, 62, 62 and 10 respectively. All the results together with some analytical data are summarized in Table IV for comparison.

EXAMPLE 8

| Cyclohexane, 20 Torr | 6.6 |
|---|---|
| n-Hexane, 20 Torr | 6.2 |
| Water, 12 Torr | 7.5 |
| Chemical Composition | wt % |
| $SiO_2$ | 85.9 |
| $Al_2O_3$ | 0.12 |
| $B_2O_3$ | 1.71 |
| $Na_2O$ | 0.25 |
| N | 1.18 |
| Ash | 91.0 |
| $SiO_2/(Al_2O_3 + B_2O_3)$ | 55.5 |
| $B/(Al + B)$ | 0.95 |

EXAMPLE 9

A portion of the product of Example 8 is calcined to remove the organic template, and then it is converted to the ammonium form by base exchange.

In turn, a portion of the ammonium form is treated as described in Example 3, the remainder being retained for activity test.

The alpha test result of the treated ammonium sample is very much higher than for the sample before treatment.

TABLE IV

Activation of Zeolite Beta that Contains Boron

| Example | 2 | 3 | 4 | 5 | 6 | 1 |
|---|---|---|---|---|---|---|
| Treating Agent | $Al_2(OH)_5Cl$ | $Al(NO_3)_3$ | $Fe(NO_3)_3$ | $Al(NO_3)_3$ | $Fe(NO_3)_3$ | None |
| Base Zeolite | $NH_4 +$ Form, Example 1 | | | $H +$ Form, Example 1 | | |
| Calcination | 1000° F., 3 Hrs in Air | | | | | |
| Boron, % wt | 0.03 | 0.01 | 0.06 | 0.01 | 0.03 | 0.90 |
| Iron, % wt | — | — | 2.3 | — | 1.6 | — |
| $Al_2O_3$, % wt | — | 4.6 | — | 4.1 | — | 0.78 |
| Alpha Value (Fresh) | 462 | 541 | 53 | 534 | 47 | 28 |
| Alpha Value (Steamed 538° C., 6 Hours, 100% Steam) | 81 | 62 | 57 | 62 | 62 | 10 |

This example together with Example 9 illustrate the use of this invention with molecular sieve zeolite ZSM-12.

Sodium hydroxide, 4.8 g, and 1 g of boric acid were dissolved in 140 g of water. A 50% methyltriethylammonium chloride solution, 35.5 g, was added. Finally, a mixture of 38.2 g of silica sol (30% $SiO_2$, Ludox LS) and 40 g of water was added with stirring. The reaction mixture was aged for 24 hours at 50° C. and then heated at 160° C. for 91 hours. A well crystallized material of ZSM-12 structure was obtained. Sorption capacities were found to be (g/100 g):

EXAMPLE 10-22

Additional experiments were conducted to demonstrate metal incorporation and acid activity control by the present method. Zeolite Beta synthesized as in Example 1 was the starting material, having an alpha value of 28 in the acid form. In each of Examples 10-22, the ammonium form of the zeolite starting material was treated in accordance herewith as in Examples 2 and 3 with various metal salts for metal incorporation. The metal salts used, the amount of metal incorporated as % wt. of final product, and the alpha value of each final product in the acid form are detailed in Table V and Table VI.

TABLE V

| Example | 10 | 11 | 12 | 13 | 14 | 15 | 16 |
|---|---|---|---|---|---|---|---|
| Chemical Used | $Sc(NO_3)_3$ | $La(NO_3)_3$ | $In(NO_3)_3$ | $Cr(NO_3)_3$ | $TiCl_3$ | $SnCl_4$ | $FeSO_4$ |
| Metal Incorporated (% wt. of final Catalyst) | 0.70 | 0.29 | 0.20 | 0.39 | 0.05 | 5.8 | 1.0 |
| Alpha Value | 29 | 25 | 2.6 | 18 | 29 | 6 | 19 |

TABLE VI

| Example | 17 | 18 | 19 | 20 | 21 | 22 |
|---|---|---|---|---|---|---|
| Chemical Used | REZAL* | $Co(NO_3)_2$ | $Zn(NO_3)_2$ | $Ni(NO_3)_2$ | $Cu(NO_3)_2$ | $Cr(NO_3)_3$ |
| Metal Incorporated (% wt. of final | 1.5 Zr 1.0 Al | 0.83 | 0.95 | 0.86 | 0.91 | 0.31 |

TABLE VI-continued

| Example | 17* | 18 | 19 | 20 | 21 | 22 |
|---|---|---|---|---|---|---|
| Catalyst) Alpha Value | 275 | 27 | 24 | 24 | 14 | 32 |

*A brand name chemical containing Al and Zr. Supplied by Reheis Chemical Company, Berkeley Heights, NJ

EXAMPLE 23

Ten grams of pillared synthetic magadiite containing 0.5% by weight of boron is added to 100 ml of water with stirring. Fifty ml of 0.1N of Al(NO$_3$)$_3$ solution is added slowly to the mixture. After 1 hour the solid is filtered and the aluminum nitrate solution exchanged repeated. After three exchanges the solid is filtered, water-washed and calcined in air for 3 hours. The product is shown to have less than 0.2% of sodium by weight. The catalytic activity of this product is measured by the alpha test and found to be 15.

For comparison, the same boron-containing magadiite is exchanged with 0.1N HCl instead of aluminum nitrate solution to remove sodium from its structure. The acid-exchanged sample is proven to have low activity as shown by an alpha value of 1.

EXAMPLE 24

Ten grams of pillared synthetic makatite containing 1.1% by weight of boron is added to 100 ml of water with stirring. Fifty ml of 0.1N of Al(NO$_3$)$_3$ solution is added slowly to the mixture. After one hour the solid is filtered and recovered. Exchanges are repeated and total four times to lower the sodium content to less than 0.2%. The dried product is sized and calcined at 500° C. in air for three hours. The calcined material has an alpha value of 12.

For comparison, the same boron-containing makatite is exchanged with 0.1N HCl instead of aluminum nitrate to remove sodium. The acid exchanged product has an alpha value of less than 1.

EXAMPLE 25

A boron-containing SAPO-5 is prepared by crystallizing a reaction mixture as disclosed in Example 9 of U.S. Pat. No. 4,440,871, containing an additional and sufficient amount of boric acid to give a product with the X-ray diffraction pattern of SAPO-5 but also containing 0.1–2.5 wt % boron. A portion of this product is calcined in static air at 1000° F. for 3 hours with a heating rate of 5° F./minute. This calcined product has an alpha value of 4.

According to the present invention, 5 grams of the calcined boron-containing SAPO-5 is stirring in 100 ml of 0.1M aluminum nitrate solution at room temperature for 3 hours. The product is filtered, washed with water, dried at 250° F., and calcined at 1000° F. for 3 hours in static air with a heating rate of 5° F./minute. The calcined product has an alpha value of 8, indicating substantial increase in acidity and in activity for hydrocarbon conversion.

What is claimed is:

1. A method for controlling the catalytic activity of a composition comprising a high silica content larger pore crystalline molecular sieve selected from the group consisting of crystalline zeolites, pillared clays and silicoalumino phosphates, and characterized by a Constraint Index of less than about 2.5, which composition contains from about 0.1 wt% to about 2.5 wt% of framework boron, said method comprising:

contacting said crystalline molecular sieve with an aqueous solution of the salt of a metal selected from the group consisting of those of Groups IVA, IB, IIB, IVB and VIII of the Periodic Table of Elements, said contacting being under conditions effective to remove boron from said crystalline molecular sieve; and converting said contacted crystalline molecular sieve to the hydrogen form.

2. The method of claim 1 wherein said crystalline molecular sieve is a crystalline zeolite.

3. The method described in claim 2 wherein said crystalline zeolite is converted to the ammonium or to the hydrogen form before said contacting step.

4. The method described in claim 2 wherein said contacting step is conducted at a pH not greater than about 6.

5. The method described in claim 3 wherein said contacting step is conducted at a pH not greater than about 6.

6. The method described in claim 2 wherein said crystalline zeolite has X-ray lines substantially as shown in Table I or Table II or Table III of the specification.

7. The method described in claim 3 wherein said crystalline zeolite has X-ray lines substantially as shown in Table I or Table II or Table III of the specification.

8. The method described in claim 4 wherein said crystalline zeolite has X-ray lines substantially as shown in Table I or Table II or Table III of the specification.

9. The method described in claim 5 wherein said crystalline zeolite has X-ray lines substantially as shown in Table I or Table II or Table III of the specification.

10. The method described in claim 2 including the steps of washing and calcining said contacted crystalline zeolite.

11. The method described in claim 3 including the steps of washing and calcining said contacted crystalline zeolite.

12. The method described in claim 4 including the steps of washing and calcining said contacted crystalline zeolite.

13. The method described in claim 5 including the steps of washing and calcining said contacted crystalline zeolite.

14. The method described in claim 2 including the step of treating said composition with an aqueous solution of pH less than 6 under conditions effective to hydrolyze said framework boron prior to contacting said composition with said metal salt.

15. The method described in claim 2 wherein said metal is selected from the group consisting of tin, copper, zinc, scandium, lanthanum, titanium, zirconium, chromium, iron, cobalt, or nickel.

16. The product composition produced by the method of claim 2.

17. A method for controlling the catalytic activity of a composition consisting essentially of a high silica content larger pore crystalline molecular sieve selected from the group consisting of crystalline zeolites, pillared clays, and silicoalumino phosphates, and characterized by a Constraint Index of less than about 2.5, which composition contains from about 0.1 wt% to about 2.5 wt% of framework boron, said method comprising:

contacting said crystals with an aqueous solution of the salt of a metal selected from the group consisting of those of aluminum, gallium, iron and mixtures thereof, said contacting being under conditions effective to remove boron from said crystals.

18. The method of claim 17 wherein said crystalline molecular sieve is a crystalline zeolite.

19. The method described in claim 18 wherein said crystals are converted to the ammonium or to the hydrogen form before said contacting step.

20. The method described in claim 18 wherein said contacting step is conducted at a pH not greater than about 6.

21. The method described in claim 19 wherein said contacting step is conducted at a pH not greater than about 6.

22. The method described in claim 18 wherein said crystals have X-ray lines substantially as shown in Table I or Table II or Table III of the specification.

23. The method described in claim 19 wherein said crystals have X-ray lines substantially as shown in Table I or Table II or Table III of the specification.

24. The method described in claim 20 wherein said crystals have X-ray lines substantially as shown in Table I or Table II or Table III of the specification.

25. The method described in claim 21 wherein said crystals have X-ray lines substantially as shown in Table I or Table II or Table III of the specification.

26. The method described in claim 18 including the steps of washing and calcining said contacted crystals.

27. The method described in claim 19 including the steps of washing and calcining said contacted crystals.

28. The method described in claim 20 including the steps of washing and calcining said contacted crystals.

29. The method described in claim 21 including the steps of washing and calcining said contacted crystals.

30. The method described in claim 18 including the step of treating said composition with an aqueous solution of pH less than 6 under conditions effective to hydrolyze said framework boron prior to contacting said composition with said metal salt.

31. The product composition produced by the method of claim 18.

* * * * *